C. N. STEVENS.
AIR AND WATER ADMISSION VALVE.
APPLICATION FILED JAN. 2, 1915.
1,209,901.
Patented Dec. 26, 1916
2 SHEETS—SHEET 1.
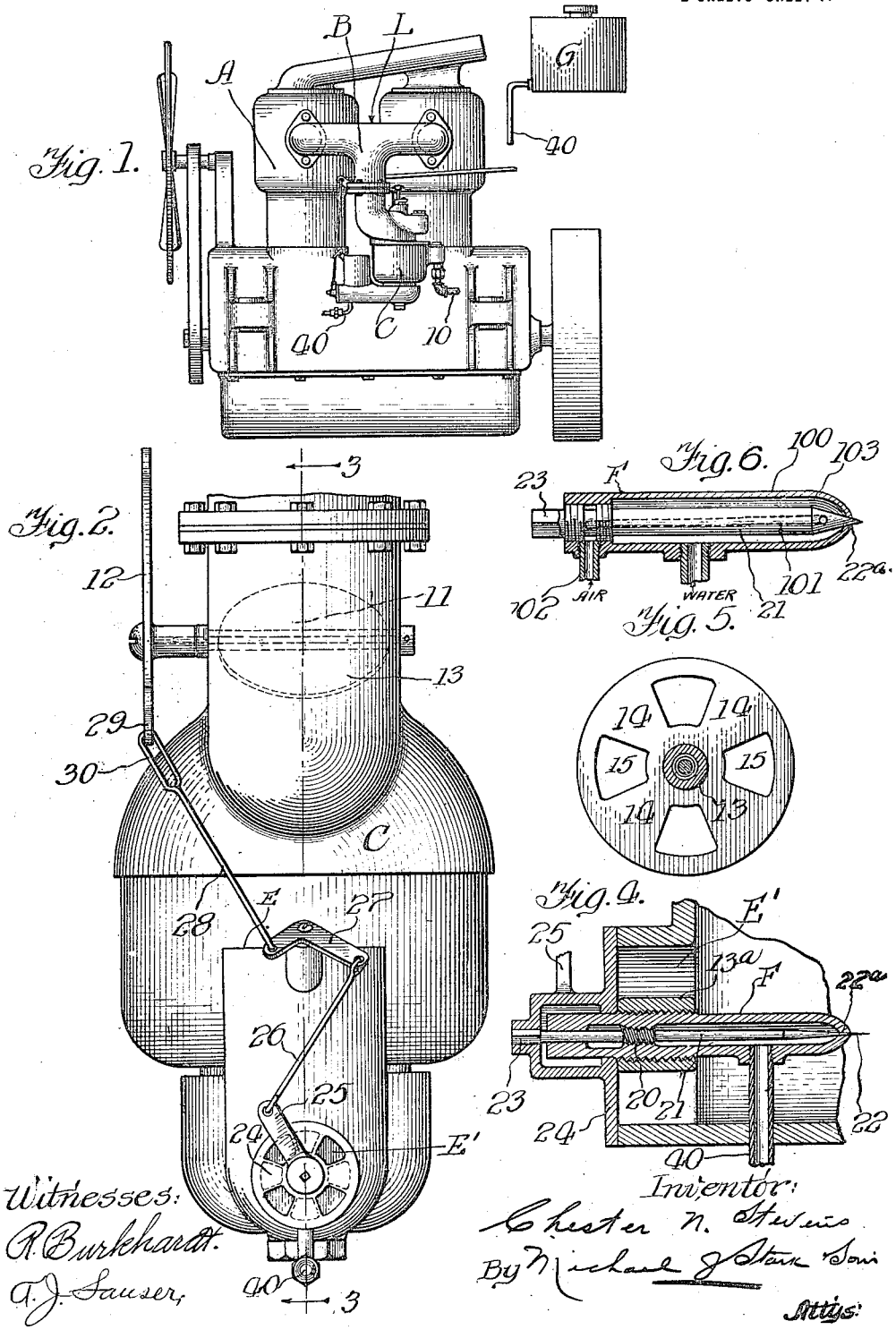

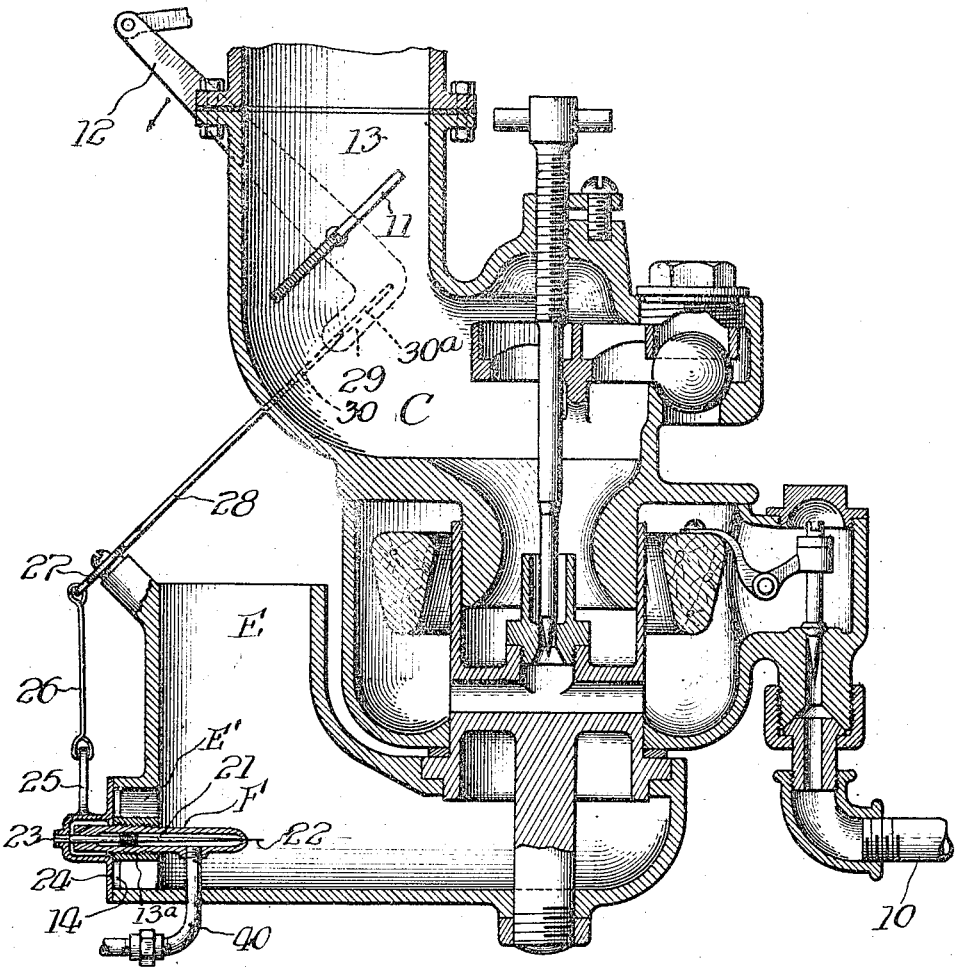

UNITED STATES PATENT OFFICE.

CHESTER N. STEVENS, OF KENILWORTH, ILLINOIS.

AIR, AND WATER-ADMISSION VALVE.

1,209,901.  Specification of Letters Patent.  Patented Dec. 26, 1916.

Application filed January 2, 1915. Serial No. 228.

*To all whom it may concern:*

Be it known that I, CHESTER N. STEVENS, a citizen of the United States, and a resident of the town of Kenilworth, in the county of Cook and State of Illinois, have invented certain new and useful Air, and Water-Admission Valve; and I do hereby declare that the following description of my said invention, taken in connection with the accompanying sheet of drawings, forms a full, clear, and exact specification, which will enable others skilled in the art to which it appertains to make and use the same.

In the drawings which serve to illustrate my said invention more fully, Figure 1 is a side elevation of a hydro-carbon motor with my invention embodied therein. Fig. 2 is a front elevation of a typical carbureter containing the elements for practising my invention. Fig. 3 is a transverse, vertical section of said carbureter in line 3—3 of Fig. 2. Fig. 4 is a section of a fragment of the carbureter. Fig. 5 is a view of a detail of construction, and Fig. 6 indicates a longitudinal section of a combined air and water nozzle.

Like parts are indicated by corresponding characters or symbols of reference in all the figures of the drawings.

The essence of my invention resides in the introduction of water, preferably in atomized or filmed form, into the cylinder or cylinders of a hydro-carbon engine simultaneously with or prior to the introduction of the explosive mixture thereinto. The water having no affinity for the explosive mixture, though being commingled therewith, retains its original identity, and, as the explosive mixture is not affected, both the atomized water and the explosive charge may be passed through the same carbureter as desired. These two mixtures of independent identities are compressed in the cylinders in the usual manner, the hydro-carbon mixture is exploded as is now the case. But a portion of the intense heat generated by the explosion is probably instantaneously absorbed by the water, which is at once converted into superheated steam of corresponding pressure, the expansive force of which steam co-acts with the expansive force of the exploded hydro-carbon gas in producing effective energy. At the present time the heat of the exploding gases is entirely wasted in the heating of the cylinder walls of the engine and in the burning onto the walls of the cylinders of the lubricating oils passing therethrough. By the introduction of the water, however, as practised in my invention, the temperature of the cylinder is greatly reduced, the pistons reciprocate more smoothly, and the use of cooling water in the cylinder walls is greatly reduced.

The phenomenon taking place in the cylinder or cylinders of an engine is probably the conversion of the energy of heat generated by the explosion of the hydro-carbon gases into effective energy by converting the water into superheated steam, as already indicated herein.

In the drawings hereto annexed, I have indicated the preferred mode of practising my invention, though it is to be understood that I may change the details thereof without affecting the essentials, which comprises a charge of water preferably in an atomized condition introduced into the cylinder or cylinders of a hydro-carbon engine prior to the ignition of the explosive charge therein.

In the practice of my invention I have found it of advantage to start the engine under the usual hydro-carbon explosions until the cylinders have become warmed up, and then introduce the water, after which I can materially reduce the supply of hydro-carbon without any loss of power; or if the carbureter is one in which the gasolene cannot be regulated, the air valves of the same may be opened to their limit of capacity, and yet an increase of power secured, which increase is accompanied by a greater smoothness in the operation of the engine, due to the much lower temperature of the moving parts thereof.

In Fig. 1 of the drawings I indicate a multi-cylinder engine by the character A, the intake pipe as B, and the carbureter as C. This carbureter may be of any selected type slightly modified to meet the requirements of my invention. In this particular instance the same is of such a well known type as to need no further description except to indicate that 10 is the gasolene inlet, 11 the throttle valve controlled by the lever 12, and 13 the outlet of the same which is connected to the usual intake pipe B of the engine in any suitable manner. The air inlet of this carbureter is shown at E, Fig. 3, and at the lower portion thereof, and possessed of its own air inlet E' is a nozzle F. This nozzle is fixed in a boss 13ª supported by radial arms 14, Figs. 3 and 5. Said nozzle has an internal screw thread 20 adapted for the reception of a spindle 21, which passes throughout the longitudinal length of said nozzle, which latter has a small orifice 22ª at the inner end thereof for the passage therethrough of a tapered end 22 of the spindle 21. The opposite or rear end of this spindle terminates exteriorly of the nozzle F in a squared end 23, which is embraced by a disk 24, similar in shape, contour, and openings as the radial arms 14, Fig. 5. This disk has projecting upwardly therefrom an arm 25, Fig. 4, which arm is connected by a link 26, Fig. 2, to a bell crank lever 27, the shorter arm of which lever is connected by a similar link 28 to a depending arm 29 of the carbureter throttle valve lever 12. It is now to be noted that link 28 has an elongated slot 30, and the lever 29 a similar elongated slot at 30ª, Fig. 3, whereby a considerable opening movement of the throttle valve 11 may take place before the spindle 21 and air disk 24 begin to rotate to an open position. The object of this construction is to permit the engine to acquire speed, up to a point, where the introduction of the water will induce the best results.

The construction of the nozzle F is such as to form a thin flower pot like spray or a flat film, as the case may be, which spray or film takes up or absorbs a certain amount of air passing through the openings 15 between the radial arms 14.

The source of water supply is a tank G located upon the automobile at any suitable point connected with the nozzle inlet by a pipe 40, which tank is under several pounds of pressure, so that the water issues from the nozzle at a predetermined speed.

During the course of many experiments and runs *entour*, I have found that the finer or more filmy the spray of water as it enters the explosion chamber of the engine, the greater the effect, and in Fig. 6, I indicate a spray nozzle 100 adapted to aerate the water and to afford a finer spray which produces excellent results. In this structure the spindle 21 has a central interior passage way 101 connecting with an air supply pipe 102. Near the tapered end of the spindle said passage way is in communication with the water chamber 103. Both air and water are under pressure, and as soon as the spindle is partially turned to open the nozzle, a true flower pot like spray of mixed water and air issues therefrom.

I have heretofore stated that the water supplied to the explosive mixture of hydrocarbon and air is in a finely divided state, which may be defined as being atomized, nebulized, or otherwise broken up into the smallest, mechanically possible, condition. I have also stated that this invention is especially designed for application in self-propelled vehicles, but it is evident that it is applicable, without change or modification, on stationary, boat, and other internal combustion motors.

I reserve the right to make such changes, alterations, and modifications as are permitted under a broad application of the doctrine of equivalents, having in mind the nature and scope of my invention.

Having thus fully described my invention I claim as new and desire to secure to myself by Letters Patent of the United States:—

1. In an internal combustion engine, a mixing chamber, an air admission element to said mixing chamber, an outlet from said chamber, a throttle valve in said outlet, means for actuating said throttle valve, a tubular extension on said air admission element, a nozzle centrally located in said extension, said nozzle being supported in said extension by a series of arms affording inlets to said extension, a valve in said nozzle, there being a chamber in said nozzle, a source of water connected to said chamber, a rotatable disk in front of said tubular extension, said disks having openings registering with the inlets to said extension, said disk being connected to said valve, and means for connecting said disk to said throttle valve.

2. In an internal combustion engine, a mixing chamber, an air admission tube on said mixing chamber, an outlet from said chamber, a throttle valve in said outlet, means for actuating said throttle valve, a tubular side extension on said air admission tube, a nozzle centrally located in said extension, said nozzle being supported in said extension by a series of arms affording inlets to said extension, a valve in said nozzle, there being a chamber in said nozzle, a source of water connected to said chamber, a rotatable disk in front of said tubular extension, said disk having openings registering with the inlets to said extension, said disk being connected to said valve, and means for connecting said disk to said throttle valve, the connection between these valves being such that the throttle valve will be partly opened or closed before the valve in the nozzle and the disk on the extension will begin to open and close.

In testimony whereof I have hereunto set my hand in the presence of two subscribing witnesses.

CHESTER N. STEVENS.

In the presence of—
W. HARDING,
C. S. STARK.